US006879725B2

(12) United States Patent
Rijavec et al.

(10) Patent No.: US 6,879,725 B2
(45) Date of Patent: Apr. 12, 2005

(54) METHOD, SYSTEM, AND PROGRAM FOR DECODING A SECTION FROM COMPRESSED DATA

(75) Inventors: Nenad Rijavec, Longmont, CO (US); Joan LaVerne Mitchell, Longmont, CO (US)

(73) Assignee: International Business Machine Corporation, Armonk, NY (US)

( * ) Notice: Subject to any disclaimer, the term of this patent is extended or adjusted under 35 U.S.C. 154(b) by 437 days.

(21) Appl. No.: 09/770,893

(22) Filed: Jan. 26, 2001

(65) Prior Publication Data

US 2002/0102026 A1 Aug. 1, 2002

(51) Int. Cl.[7] ................................................ G06K 9/36
(52) U.S. Cl. ...................................... 382/233; 382/232
(58) Field of Search .............................. 382/232, 233, 382/244, 246, 247; 358/426.12, 426.13, 453, 538; 341/65, 67, 76, 107; 348/14.13, 409.1, 410.1

(56) References Cited

U.S. PATENT DOCUMENTS

| | | |
|---|---|---|
| 4,888,645 A | 12/1989 | Mitchell et al. |
| 4,905,927 A | 3/1990 | Lesse |
| 4,968,135 A | 11/1990 | Wallace et al. |
| 5,196,945 A | 3/1993 | Ho et al. |
| 5,206,734 A | 4/1993 | Kao |
| 5,229,863 A | 7/1993 | Kao et al. |
| 5,477,042 A | 12/1995 | Wang |
| 5,592,297 A | 1/1997 | Van Dorsselaer |
| 5,623,556 A * | 4/1997 | Murayama et al. ......... 382/233 |
| 5,675,332 A | 10/1997 | Limberg |
| 5,680,486 A | 10/1997 | Mita et al. |
| 5,764,374 A * | 6/1998 | Seroussi et al. ............ 382/244 |
| 5,784,631 A | 7/1998 | Wise |
| 5,798,719 A | 8/1998 | Wise et al. |
| 5,805,914 A | 9/1998 | Wise et al. |
| 5,808,570 A | 9/1998 | Bakhmutsky |
| 5,835,148 A | 11/1998 | Yoon |
| 5,859,604 A * | 1/1999 | Slattery et al. ............. 341/107 |
| 5,875,270 A * | 2/1999 | Nakamura ................... 382/232 |
| 5,889,561 A | 3/1999 | Kwok et al. |
| 5,956,429 A | 9/1999 | Burns |
| 6,381,371 B1 * | 4/2002 | Epstein et al. ............. 382/246 |
| 6,690,832 B1 * | 2/2004 | Mitchell et al. ............ 382/233 |

OTHER PUBLICATIONS

Slattery et al, The Qx–coder, IBM Journal of Research and Development: Data Compression in ASIC cores, vol. 42, No 6, 1998, p 767–784.*

F.A. Kampf, Performance as a function of compression, IBM Journal of Research and Development: Data Compression in ASIC cores, vol. 42, No 6, 1998, p 759–766.*

W. B. Pennebaker, et al., "JPEG Still Image Data Compression Standard", 1993, pp. 409–430.

R.B. Arps, et al., "A multi–purpose VLSI chip for adaptive data compression of bilevel images", IBM J. Res. Develop, vol. 32, No. 6, Nov. 1988, pp. 775–795.

* cited by examiner

*Primary Examiner*—Yon J. Couso
(74) *Attorney, Agent, or Firm*—David W. Victor; Konrad Raynes & Victor LLP

(57) ABSTRACT

Provided is a method, system, program, and data structure for decompressing a compressed data stream whose decoded output comprises lines of two-dimensional data or other data whose decoding depends upon previously decoded data and where the desired output is only part of sequentially decoded output. Received are a compressed data set, at least one pointer to a location in the compressed data stream whose decoded output comprises a location on a line of data, and decoding information for each received pointer that enables decoding from a point within the compressed data stream addressed by the pointer. For each received pointer, the following steps are performed: (i) accessing the location in the compressed data stream addressed by the pointer in the reentry data set; and (ii) using the decoding information in the reentry data set to decode compressed data from the accessed location.

62 Claims, 5 Drawing Sheets

METHOD, SYSTEM, AND PROGRAM FOR DECODING A SECTION FROM COMPRESSED DATA

BACKGROUND OF THE INVENTION

1. Field of the Invention

The present invention relates to a method, system and program for decoding a section of output from compressed data.

2. Description of the Related Art

Digital images may use one or more bits to describe the color intensity at each pixel. The term "pixel" as used herein refers to one or more intensity or bit values at a data point that represents data to be rendered (i.e., printed, displayed, etc.), where the data to be rendered may include, but is not limited to, images, text, composite images, graphs, collages, scientific data, video, etc. A pel is a picture element point that may be expressed with one bit. If only one bit is used to express the intensity, then the image is a bilevel image where there are two possible intensity values per pixel, such as black and white or fill saturation and no intensity. Digital monochrome images that allow for more than two intensities per pixel express the intensities as shades of grey.

Most systems compress image data before transmitting the data to an output device, such as a printer or display, that renders the image data. The output device must decode or decompress the compressed image to output to print or otherwise render it. Compressed images may also be archived and then at some later time transmitted to an output device for decompression and rendering, e.g., printing or display.

Compression has become especially important as the resolution of digital images continues to increase, which has substantially increased the size of the digital image files. Data compression was essential to allowing digital facsimile transmission to become practical. Three international standards for facsimile data compression include the G3 standard Modified Huffman (MH), the G3 Modified READ (MR), and the G4 Modified Modified Read (MMR). G3 MH codes each line independently with one-dimensional run lengths alternating between "white" and "black" Huffman code tables. G3 MR codes at least every second or fourth line with G3 MH. The rest of the lines are coded relative to its preceding line using vertical reference codes out to plus or minus three whenever possible. Otherwise a run prefix is followed by a pair of runs coded with the MH tables. Pairs of runs on the preceding line are skipped over with a PASS code. G4 MMR compresses image data by assuming an all white history line before the top image line and encodes all lines two-dimensionally with reference to a history line, i.e., the same coding used for the G3 MR two-dimensional lines. The G4 MMR decoder must maintain an entire previous history line when decompressing data to sequentially decode the entire image. G3 MH allows random access to each line if a pointer is kept to the end-of-line (EOL) codes. G3 MR allows random access only for those EOLs that are followed by MH coded lines. G4 MMR does not have EOLs between compressed lines and so does not allow anything but sequential decoding from the top of the image.

Another image decoding technique is the Adaptive Bi-Level Image Compression (ABIC) algorithm. An ABIC coder uses arithmetic coding to code an image as a bi-level image. The ABIC algorithm of the prior art would sequentially code each bit of image data by using the seven nearest neighbor bits and a probability distribution that is calculated based on previously coded data. In current implementations, the ABIC decoder maintains a history group of bits comprising the last N+2 decoded bits, where N is the length of a line. In certain current implementations, the ABIC decoder uses seven of the bits, including the last two decoded bits and bits in the history range from the (N−2) bit to the (N+2) bit. These are the seven nearest bits in the binary image. Details of using the ABIC algorithm to code and decode data are described in the IBM publication entitled "A Multi-Purpose VLSI Chip for Adaptive Data Compression of Bilevel Images", by R. B. Arps, T. K. Truong, D. J. Lu, R. C. Pasco, and T. D. Friedman, IBM J. Res. Develop., Vol. 32, No. 6, pgs. 775–795 (November 1988) and the commonly assigned U.S. Pat. No. 4,905,297, which publication and patent are incorporated herein by reference in their entirety.

In certain cases, a user may only want to access a section of an image, such as a cropped portion of an image, cut out, etc. With prior art techniques, to access an image section, the ABIC and G4 MMR decoders must decode and buffer the entire previous history line prior to the current line, and then buffer and use the previous history line to decode the next line. Such techniques must entirely decode and buffer each line even though only a section of the line is needed. As digital image resolution and file size increases, the processing and memory resources and time needed to buffer each line of decoded data and decode each line to access only a section of the image likewise increases.

Accordingly, there is a need in the art for techniques to improve the image decoding process.

SUMMARY OF THE PREFERRED EMBODIMENTS

Provided is a method, system, program, and data structure for decompressing a compressed data stream whose decoded output comprises lines of two-dimensional data. Received are a compressed data set, at least one pointer to a location in the compressed data stream whose decoded output comprises a location on a line of data, and decoding information for each received pointer that enables decoding from a point within the compressed data stream addressed by the pointer. For each received pointer, the following steps are performed: (i) accessing the location in the compressed data stream addressed by the pointer in the reentry data set; and (ii) using the decoding information in the reentry data set to decode compressed data from the accessed location.

Preferred embodiments provide a technique using reentry data sets to allow decoding of only a section of an image that a user wants to access. This is an improvement over prior art techniques that decode the entire compressed image in order to access just a section of the image. By only decoding that portion of the compressed data stream whose decoded output is the desired section of the image, processor and memory resources are conserved, thereby reducing the time needed to decompress an image section.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
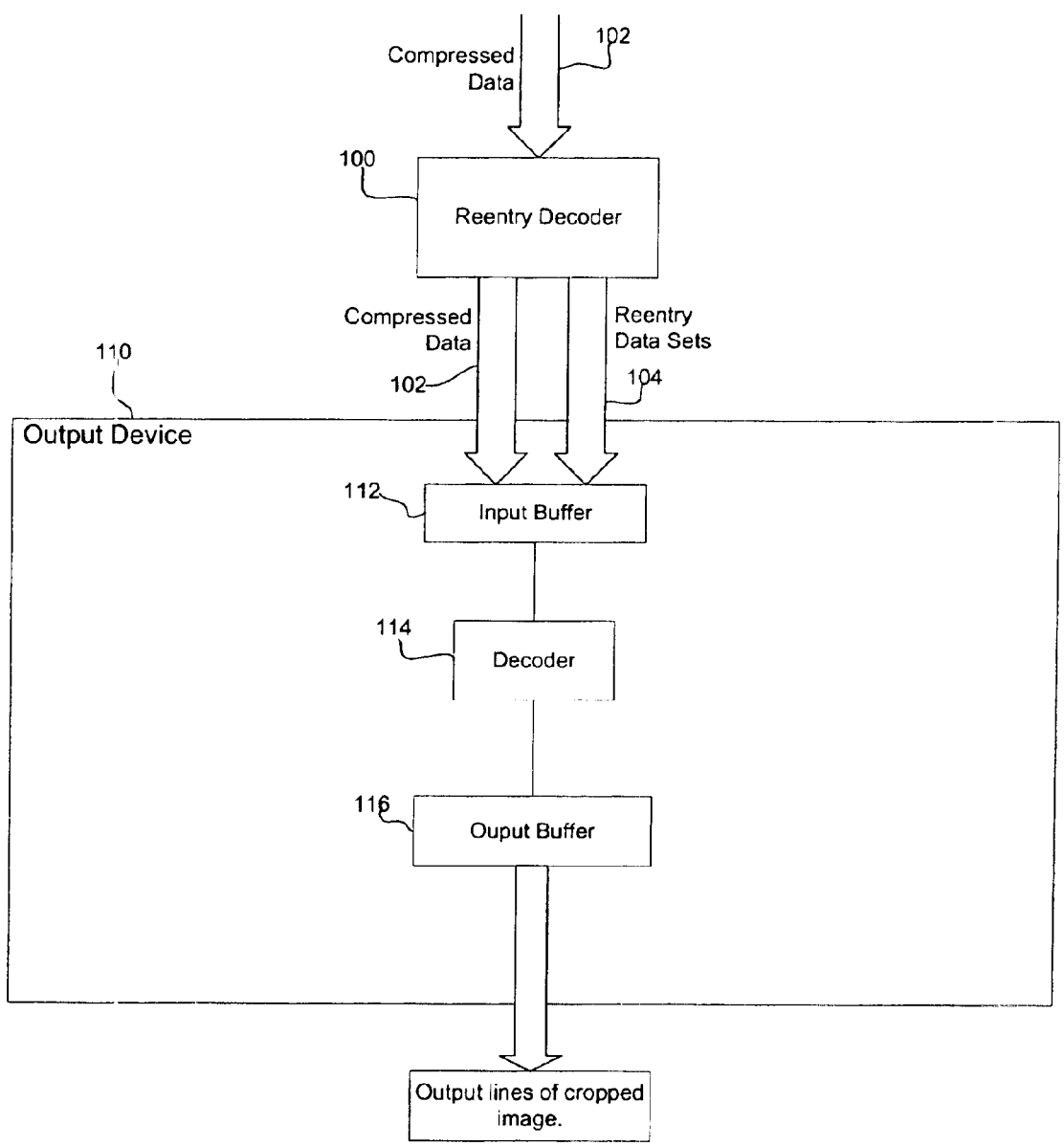
FIG. 1 illustrates a computing environment in which preferred embodiments are implemented.

FIG. 1 illustrates a computing environment in which preferred embodiments are implemented. A reentry decoder 100 receives a compressed data stream 102 compressed using an entropy coding technique known in the art, such as ABIC or Huffman encoding schemes known in the art. The reentry decoder 100 decompresses the compressed data stream 102 in the manner described below to generate reentry data sets 104 to allow a subsequent decoding operation to decode an image section of the entire image using only partial history data and without having to decode the entire image. The term "image section", as used herein, refers to any section or portion of an entire image that includes less than all the bits used in the entire image. The image section may be a rectangular or square shape, or any other shape. The image section typically has a line width that is less than the line width of the entire image.

In described implementations, a reentry data set is provided for each line in the image section. The reentry data set includes a pointer into the compressed data at the location whose decoded output is the start of the image section in the line and an indication of the location in the compressed data stream whose decoded output is the end of the image section on the line, such as a length of the image section intersecting the line or an end pointer to that location in the compressed data stream whose output is the end of the image section on the line. In described implementations, the decoder 114 may start decoding from the location in the compressed data stream 102 addressed by the pointer in the first reentry data to set for the image section to be decoded. Thus, this first reentry data set must include sufficient history data to allow decoding to begin from the location in the compressed data stream 102 addressed by the pointer.

Certain embodiments are described as if the first line is decoded and its preceding line is saved in the first reentry data set as part of the full history. If the preceding line is an all white line, this may be particularly efficient This description also allows the history for the first line to be handled differently and then the decoding of the entire section to include the output. Alternate embodiments could save the full history for the second line and extract the first line (without decoding) from the full history contained in the first reentry data set. This may be more efficient in terms of processing and obviously requires less compressed data since the first line does not need to be decoded. Other alternate embodiments could decode two less bits on each side of the section and use the extra minimal history bits to obtain the edge columns.

Figures 2A, 2B, 3:
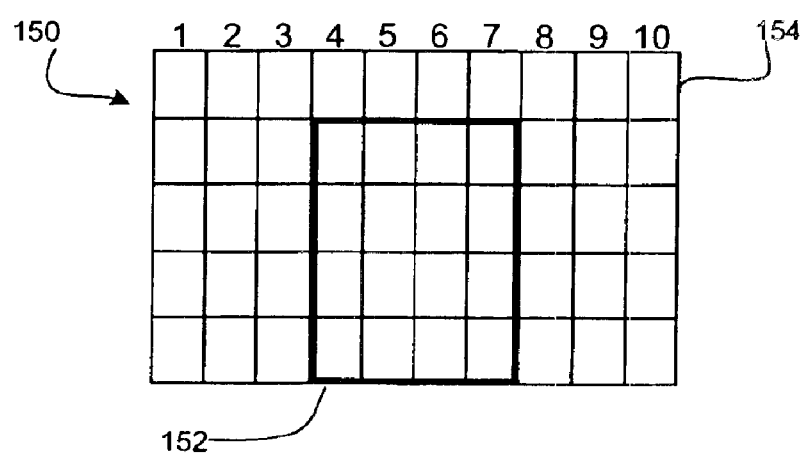
FIGS. 2a and b illustrate the history bit values maintained for use in decoding compressed data in a manner known in the prior art.
FIG. 3 illustrates an image section within an image.

In ABIC encoding, if a line comprises N bit values, then the history data to decode a line includes the seven nearest neighbor bit values to the bit value being decoded. These nearest neighbor bits include the two bit values preceding the bit being decoded and the (N−2) through (N+2) bit values preceding the bit being decoded. FIG. 2a illustrates the seven history bits used to decode bit "X" in the event that the bit to decode is in the middle of a line of the bit plane, which would comprise the two most recent decoded bits i and j, as well as bits a through e, which are the (N−2) through (N+2) bit values preceding the bit "X" being decoded. FIG. 2b illustrates another example of the bits to use to decode bit "X", which would comprise the last two decoded bits i and j to the left of the compressed data whose output is the bit "X" being decoded and bit values a through e which are the (N−2) through (N+2) bit values preceding bit X. In this way, the nearest bits are defined in raster scan order. The selection of history bit values to use to decode one bit shown in FIGS. 2a, b is the methodology used in the current art to select history bit values to use in the decoding operation. In ABIC, the seven selected neighbor bits are used to select one of the 128 probability estimates to use to decode the data in a manner known in the art.

FIG. 3 illustrates an image 150 with an image section 152, formed within bit locations 4 to 7 of the lines within the image 150. In the example of FIG. 3, N is equal to 10 and the seven nearest neighborhood bit values include the $8^{th}$ through $12^{th}$ previous bits from the bit value being decoded plus the two bits to the left of the bit being decoded. Thus, the history values used in ABIC decoding, include bits from the previous line and may include up to two bits from the current line preceding the bit being decoded. In the example of FIG. 3, the image section 152 extends from the fourth to seventh bits on each line. The bits used to decode the first bit in the image section 152, would include the two bits 2 and 3 to the left of the start of the image section at bit 4 as well as bits 2 through 6 from the previous line, which are the $8^{th}$ (N−2) to $12^{th}$ (N+2) bits preceding the bit 4 being decoded, or the start of the image section. For the last bit (bit 7) in the lines of the image section following the first line of the image section 152, the history bit values include bits 5 and 6 (the two to the left of the $7^{th}$ bit) as well as bits 5 to 9 of the previous line (which are the $8^{th}$ to $12^{th}$ bits preceding the bit 7 being decoded. This example illustrates that for ABIC implementations, to decode a line of an image section following the first line of the image section, all that is needed is the data of the previously decoded line of the image section plus a few bits preceding and following the image section in the previous line as well as a few bits preceding the image section on the line being decoded. Because the image section in the previous line is obtained in the decoding operation of the image section, the only data that must be included in the reentry data sets to allow decoding of the lines of the image section following the first line are the few bit values following the image section in the previous line and the few bit values preceding the image section in the current line being decoded. These extra current line's bits will become the extra preceding line's bits for the next line.

The reentry data sets would also include information in addition to previously decoded bit values to perform the decoding. For instance, in ABIC implementations, each reentry data set would include 128 probability estimates and register values used by the ABIC decoder. The Q-coder used in ABIC coding/decoding maintains A and C registers indicating an interval being coded. The decoder that decodes the ABIC data stream looks at the seven neighbor bits and determines a probability estimate for the current bit being considered. The decoder then uses one of the 128 probability estimates to decode the actual bit value. As known in the ABIC art, the coding and decoding systems use the same statistical model or dynamic probability estimation process to determine how each coding decision is "conditioned" on prior coding decisions. Further details of decoding and encoding the data stream are described in U.S. Pat. No. 4,905,297 and the IBM publication "A Multi-Purpose VLSI Chip for Adaptive Data Compression of Bi-Level Images", both incorporated by reference above. Further, "JPEG: Still Image Data Compression Standard", by William B. Pennebaker and Joan L. Mitchell (Van Nostrand Reinhold, 1993), at pages 409–430 describe arithmetic binary decoding and encoding. In Huffman coding models, different data would be maintained with the neighbor bits, such as the color table to use. For G3 MH, each line is coded independently so no prior history line is needed. In addition to the color of the first run, the location of the start of that run in the original image is needed. Alternatively, the compressed data pointer could point to the start of the second run in the section and its color could be saved. Then the location of the start of that run is always a positive number and limited to the width of the section rather than the distance to the left edge of the original image. The first run would be of the opposite color.

In G4 MMR implementations, which is a Huffman encoding technique, each reentry data set would include the color of the data, which is represented as "one bit" for bilevel data. The G4 MMR Huffman encoding scheme uses the color data when selecting decoding information from the Huffman tables. For G4 MMR instead of decoding the first bit of a line contained within the section, it would be sufficient to start decoding at the first transition contained within the section. As with G3 MH the location in the image section for this second run would need to be part of the history and the data on the line up to that transition would be known to be of the other color. In addition to the pointer to the compressed data for this second run, the decoder would need to know if this run is a vertical reference code (including the PASS code and run prefix code) or the second run of the pair of runs that follow the run prefix code. If the first run containing the first bit in the section is decoded, then three extra bits are needed on the left edge of the preceding line to correctly handle a VR3 (vertically right three pels) code. By initiating decoding after the first transition inside the section, only two extra bits are needed on the left. On the right edge, the VL3 (vertically left three pels) code would require three extra bits to correctly decode it.

After generating reentry data sets 104 for lines of the image section 152, the reentry decoder 100 transfers the received compressed data stream 102 and calculated reentry data sets 104 to an output device 110, which may comprise any device known in the art capable of rendering data, such as a printer, display, a storage device for future rendering, etc. The compressed data stream 102 and reentry data sets 104 are stored in buffer 112 of the output device 110. The output device 110 includes a decoder 114 that accesses the reentry data sets 104 in the buffer 112 to decompress only the image section 152 from the compressed data stream 102 of the entire image 150. The decoder 114 stores the decompressed segments of the image section in buffer 116. The decompressed image section 152 may then be transferred from the buffer 116 to the output device and rendered or further processed, e.g., halftoned, screened, dithered, etc., before being rendered.

The buffers 112 and 116 may be part of the same memory device or separate hardware buffers or memory devices. As discussed, the reentry decoder 100 and decoder 114 may comprise a Q-Coder, an ABIC decoder, or any other decoder known in the art, such as a Huffman decoder. The reentry decoder 100 may be located either external or internal to the output device 110. If the reentry decoder 100 is located internal to the output device 110, then the reentry decoder 100 unit may be separate from the decoder logic 114 or both may be part of the same logic unit. In alternative embodiments, the encoder could save-off the reentry data sets when coding the data stream and provide the reentry data sets to the decoder 114 to use to decode the compressed data stream at multiple points. This alternative implementation avoids the need for a reentry decoder 100 as the encoder is used to generate the reentry data sets. Embodiments describe reentry data sets for only one image section. Alternately, multiple reentry data sets could be saved for multiple image sections.

Figure 4:
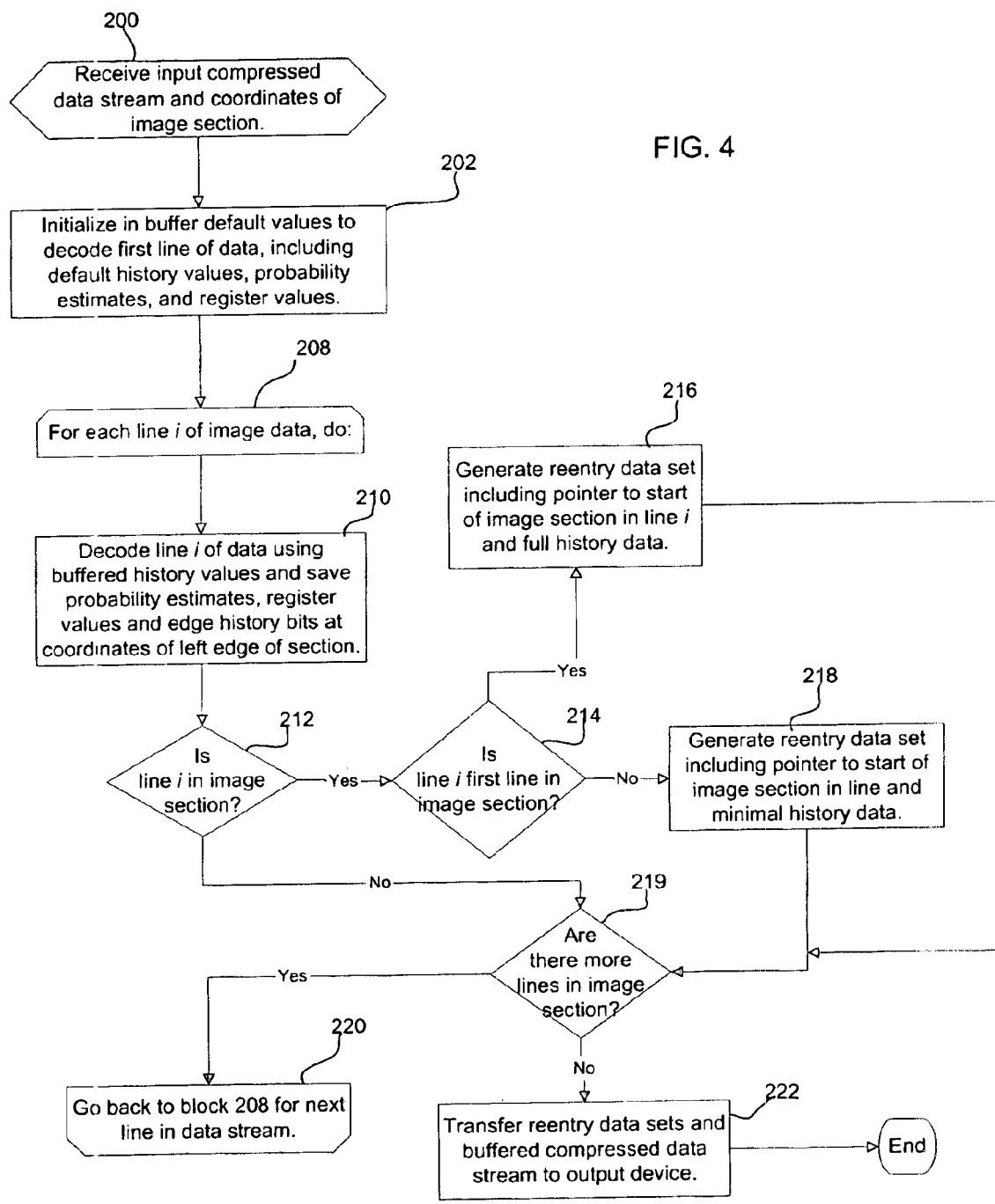
FIG. 4 illustrates logic to generate reentry data sets in accordance with preferred embodiments of the present invention.

FIG. 4 illustrates logic implemented in the reentry decoder 100 to decode the compressed data 102 for the purpose of generating reentry data sets 104 for the decoder 114. Control begins at block 200 with the reentry decoder 100 receiving the compressed data 102 and coordinate information indicating the output location of the image section to decode from the compressed data stream 102. In the described implementations, the image section begins and ends at the same location on each line of the image comprising the output of the compressed data stream 102. The reentry decoder 100 starts by initializing (at block 202) in its internal buffer the default values used to decode the first line of data in the compressed data stream 102, which would include default history bit values, e.g., all zero bit values, default probability estimates, and default register values. In non-ABIC implementations, the reentry decoder 100 may not use probability estimates and register values to decode. For instance, in G4 MMR implementations, the color of the next run, its type (Vertical reference or second MH coded run) and its output location, would be buffered and used as history information to decode the data. Extra edge bits may also be needed. In certain implementations, the reentry decoder 100 uses a rolling buffer and overwrites previously decoded as each bit is decoded to maintain the last N plus two bits, where N is the number of bits in a line.

The reentry decoder 100 performs a loop at blocks 208 to 220 for each line i in the decoded output of the compressed data stream 102 up to the end of the desired section. Within this loop, the reentry decoder 100 decodes (at block 210) line i of the data stream using the buffered previous history values, e.g., in ABIC implementations, the previous decoded line (N bits) plus two bits from the further preceding line, and the buffered probability estimates and register values available at the end for the previously decoded line (i−1). While decoding line i, the reentry decoder saves in some form its probability estimates, register values, and minimum history needed for image section decoding at the edges of the image section. This information may no longer be available in buffers at the end of decoding line i. If (at block 212) the decoded line i is within the image section and if (at block 214) line i is the first line in the image section, then the reentry decoder 100 generates (at block 216) a reentry data set including a pointer to a location in the compressed data stream whose decoded output is the first bit in the image section and the full history data (e.g., in ABIC the full history data includes the (N−M−2) through (N+2) bit values preceding the first bit in the image section as well as the two bit values immediately preceding the first bit in the image section, and the probability estimates and register values existing after decoding the bit value preceding the first bit in the image section). If (at block 214) the decoded line i is not the first line in the image section, then the reentry decoder 100 generates (at block 218) a reentry data set including a pointer to a location in the compressed data stream whose decoded output is the start of the image section in line i and the minimal history data (e.g., in ABIC, the history data for lines following the first line includes the two bit values on the right side of the image section in the previous line (i−1), the two bit values preceding first bit in line i of the image section, and the probability estimates and register values existing after decoding the bit value preceding the start bit value of the image section in line i). If (at block 212) line i is not in the image section or after generating the reentry data set (at block 216 or 218), a determination is made (at block 219) if there are more lines in the image section. If so, control proceeds (at block 220) back to block 208 to the next (i+1)th line; otherwise, if not, the reentry decoder 100 transfers (at block 222) the reentry data sets and the buffered compressed data to the output device. For simplicity of exposition, the description of this embodiment completes the decoding of the section before transferring the output data to the rendering device. Alternate embodiments could alternate and/or overlap the decoding and outputting to minimize the internal buffers needed.

With the logic of FIG. 4, the reentry decoder 100 does not need a large buffer to generate the reentry data sets 104 because it only needs to buffer the last N plus two decoded bits at a time for each bit decoded in addition to the statistical data and other information needed to continue decoding, such as probability estimates, register values, etc.

After generating the reentry data sets 104, the reentry decoder 100 transmits the compressed data 102 and reentry data sets 104 to the decoder 114. In preferred embodiments, the reentry decoder 100 transfers the data stream in compressed format regardless of whether the reentry decoder 100 is located internal or external to the output device 110 to minimize the transfer time to the buffer 112 used by the decoder 114.

In FIG. 4 the reentry data sets are described as being generated on a per line basis to minimize buffering requirements. If the reentry data sets are being generated in the encoder or more buffering is allowed, then the history information on the left and right edges of the image section is available in the original image. Several columns on the right and left edges of the image could be used to create a small image, optionally rotated, and compressed with the same or another algorithm. This compressed edge information could be part of the full history for the first line and decompressed into a temporary buffer, rotated back into the correct orientation if necessary, and then used when needed. For this embodiment, the reentry decoder only needs to save a pointer to the compressed data, the A and C registers, and its 128 probability estimates just before decoding a pel to the right of the saved left-edge column pels. For G4 MMR, after the first reentry data these decompressed columns give the color of the first run. If the output location points into these pels, the compressed data pointer codes the next run continuing the next pel color. Otherwise, the last column pel color is continued to the output location and the next codeword is for a run of the opposite color.

Figure 5:
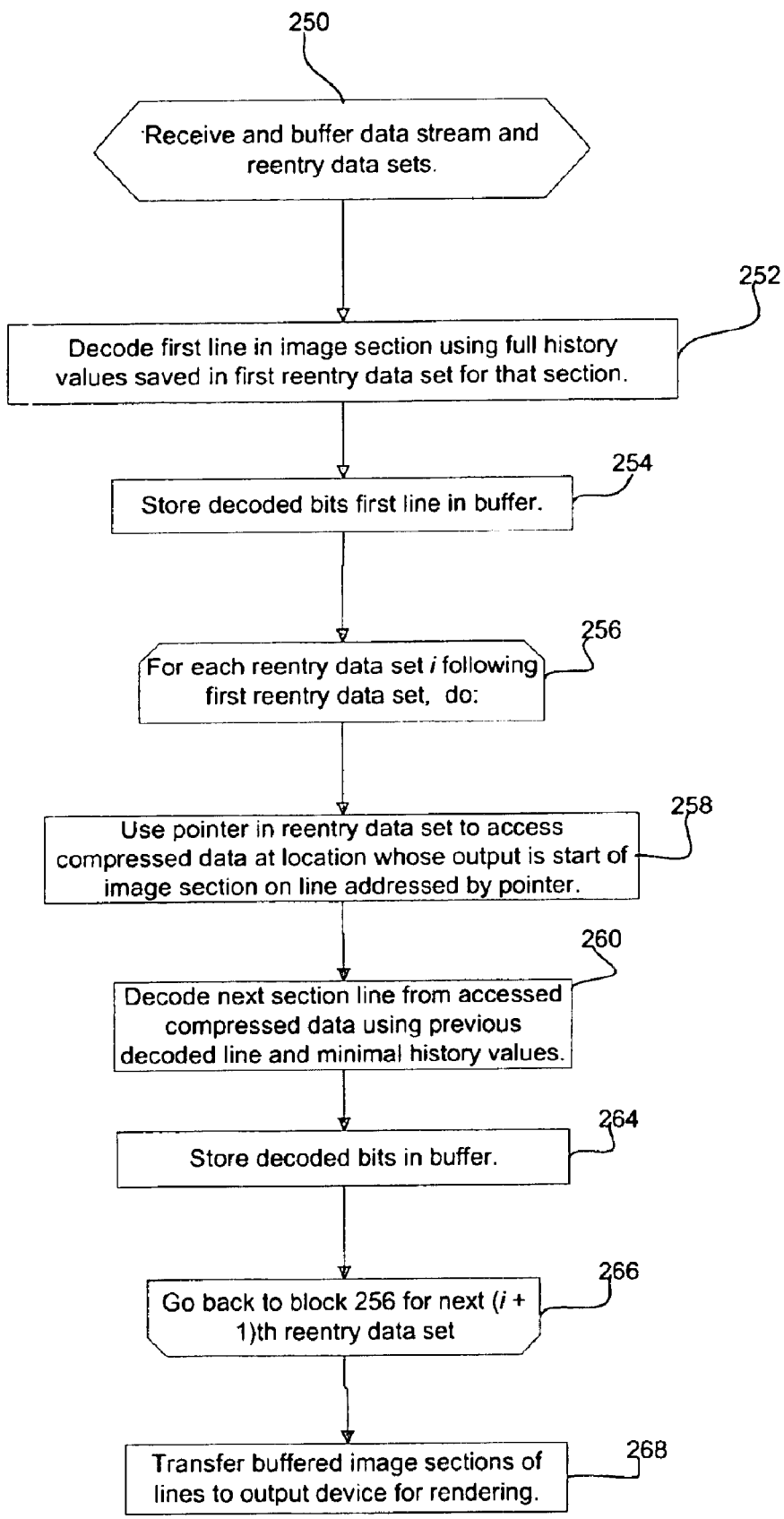
FIG. 5 illustrates logic to use the reentry data sets to decompress and output the image section in accordance with preferred embodiments of the present invention.

FIG. 5 illustrates logic implemented in the ABIC-like decoder 114 to decompress the compressed data stream 102 using the generated reentry data sets 104. Control begins at block 250 with the decoder 114 receiving and buffering in buffer 112 the compressed data stream 102 and reentry data sets 104. The decoder 114 decodes (at block 252) the first line in the image section using the full history values from the first reentry data set. The decoded bits from the first line of the image section is then saved (at block 254) in the output buffer 116.

The decoder 114 performs a loop at blocks 256 to block 266 to decode the lines in the image section following the first line of image section for each reentry data set. The decoder 114 uses (at block 258) the pointer in the reentry data set to access the compressed data at a location whose output is the start of the image section in the line addressed by the pointer. For G4 MMR the pointer to the compressed data is for the next transition. The output location of this transition is also saved. The decoder 114 then decodes (at block 260) the next line of image section data from the accessed location in the compressed data stream 102 using the previous decoded line and minimal history values. The decoder 114 would decode the data using the two immediately preceding decoded bit values, which may be obtained from the reentry data set or from the decoded data on line i, as well as the (N−2) through (N+2) bit values preceding the bit being decoded, which may be obtained from the previously decoded line (i−1). As discussed, the reentry data set i would include information to determine the end of the image section to decode in the line. The decoded bits of the image section from the line are then stored (at block 264) in the output buffer 116. At block 266, control proceeds back to block 256 to decode the lines of the image section for any following reentry data sets. After decoding and buffering all the lines from image section, the decoder 114 transfers (at block 268) the image section data to an output device for rendering.

With the logic of FIG. 5, the decoder 114 outputs decompressed data faster and using less processor and memory resources than techniques known in the art because the decoder 114 is able to break into the compressed data stream to sequentially decode just that portion of the image section needed. In the prior art, the decoder must sequentially decode the entire image from beginning to end of the image section before extracting the image section. The described implementations are particularly advantageous in situations where the image size is substantially large and the image section is only a small part of the total image. In such cases, the described implementations avoid having to decompress a substantial part of the image, which can be processor and memory intensive.

In alternative implementations, the reentry decoder 100 when decoding the compressed data stream may extract the portion of the compressed data stream whose output is the image section and then transfer that image section portion of the compressed data stream to the output device 110 for decoding. Such implementations further reduce data traffic across the communication interface to the output device 110 as the compressed data being communicated includes less bytes. In such implementations, the reentry data sets for the compressed data whose output is the first line of the image section would include the same data as discussed above, including the two bits to the left of the first bit of the image section on the line and the (N+2) to (N−M−2) bit values from the previous line where M is the width of the image section. All that is needed in the reentry data sets to decode the lines following the first line are the few bit values on the right side of the image section of the previous line as well as the two bit values preceding the first bit of the image section in the line being decoded. For instance, with respect to FIG. 3, to decode the first line of the image section 152, all that is needed are bits 2 and 3 of the first line of the image section 152 (the two to the left of the bit being decoded), the $4^{th}$ through $7^{th}$ bit values from the preceding line 154 and the two bits to the left and right of the image section locations in the preceding line 154 (bits 2–3 and bits 8–9 of the preceding line 154). In this way, only partial history information is provided to decode all the lines of the image section 152, after the first line.

The described implementations utilize the previously generated reentry data sets to allow the decoder to break into the compressed data stream at the location identified by the pointer in the first reentry data set to decode and output the image section using the history values in the reentry data sets, without having to decode those portions of the image outside the image section area.

In implementations where only the portion of the compressed data whose output comprises the image section is transferred to the decoder 114 to decode using the reentry data sets 104, the decoder 114 must be programmed to recognize the image section of the compressed data stream. This may be accomplished by changing N from the width of the line of the full image to the width of the image section line plus the few bits surrounding the image section that are used to decode the image section. In other words, the new N is the width of the line minus those bits in each line that are not used to decode the compressed data stream whose output is the image section. In the example of FIG. 3, for implementations using only the image portion of the compressed data stream, N equals eight, the four image section bits (bits 4–7) plus the two bits (bits 2, 3, 8, and 9) on each side of the image section 152. This modification to N allows the decoder 114 to decode the image section of the compressed data stream, which is a smaller file then the full compressed data using the same reentry data set values. Further, the pointer information in the reentry data sets would also have to be adjusted as the compressed data stream only includes data pertaining to the image section.

Figure 6:
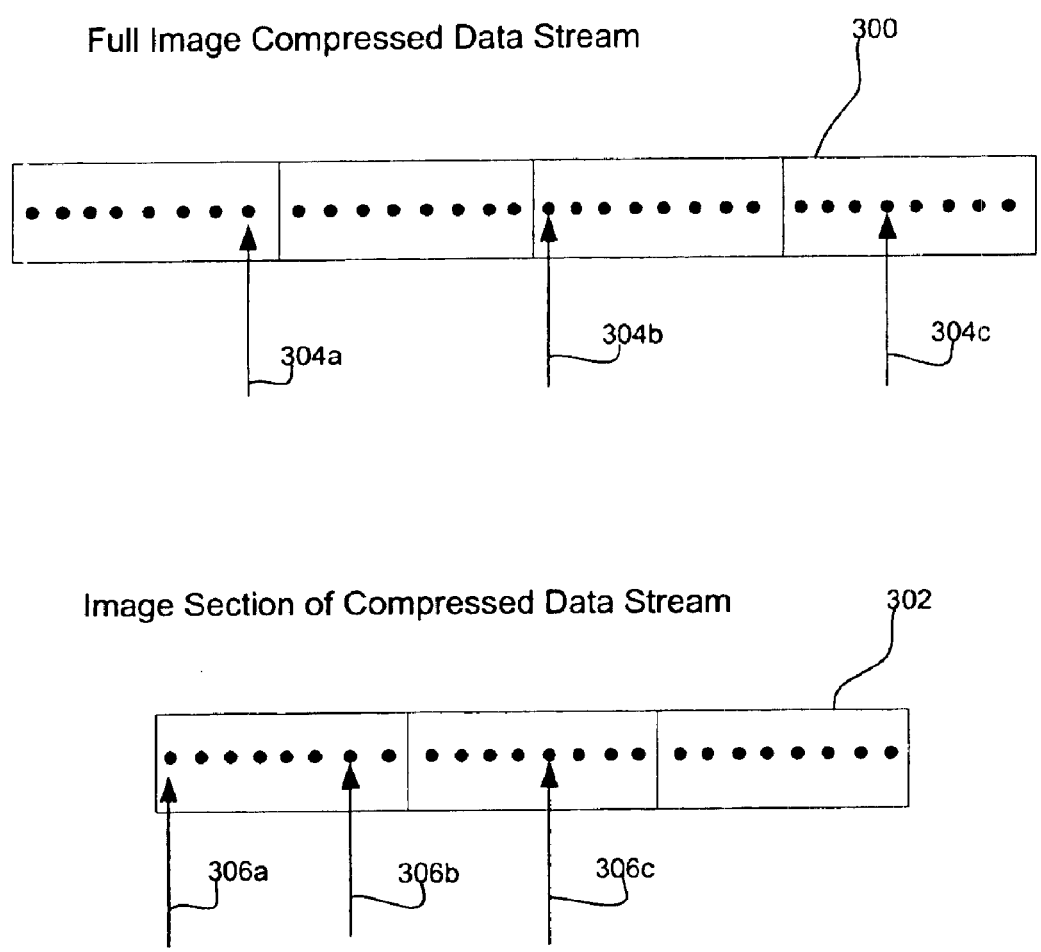
FIG. 6 illustrates compressed data streams used with the described implementations.

FIG. 6 illustrates how the full image compressed data stream 300 including the full image may be reduced to the image section compressed data stream 302. In the implementation where the full image compressed data stream 300 is provided, such as the implementation described with respect to FIGS. 4 and 5, the pointers 304a, b, c comprise the pointers included in the reentry data sets providing the location in the compressed data stream whose output is the start of the image section on each line. The line width of the image section is less than the line width of the output of the full image compressed data stream 300 plus a few extra bits if needed by the decoding algorithm. Pointers 306a, b, c would be included in the reentry data sets for the image section of the compressed data stream 302. The image section compressed data stream 302 includes only that portion of the compressed data stream whose output is the image section, and may not include any of part of the full image compressed data stream 300 whose output does not comprise the image section. For these reasons, the reentry decoder 100 must include different logic to generate the reentry set pointers for the image section compressed data 302 and the full image compressed data 300 as the pointers to the first bit of the image section of each line are at different locations in the different compressed data streams 300 and 302, as shown in FIG. 6. Further, as discussed, the decoder 114 must include logic specific to the content of the compressed data stream 300 or 302, which adjusts the setting for N, which is either the full width of the line of the fill image for the full image compressed data stream 300 or the line width of the image section for the image section compressed data stream 302.

Following are some alternative implementations of the preferred embodiments.

The preferred embodiments may be implemented as a method, apparatus or article of manufacture using standard programming and/or engineering techniques to produce software, firmware, hardware, or any combination thereof The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.), a file server providing access to the programs via a network transmission line, wireless transmission media, signals propagating through space, radio waves, infrared signals, etc. The article of manufacture includes hardware logic as well as software or programmable code embedded in a computer readable medium that is executed by a processor. Of course, those skilled in the art will recognize that many modifications may be made to this configuration without departing from the scope of the present invention.

Preferred embodiments were described with respect to a printer output device. However, the output values may be rendered using output devices other than printers, such as such as display monitors, a storage device for future rendering, etc.

In preferred embodiment, the decoder and reentry decoder are implemented as hardware, e.g., a Field Programmable Gate Array (FPGA), Application Specific Integrated Circuit (ASIC), etc. In alternative embodiments, the decoder and reentry decoder may be implemented as software executed by a processor.

Preferred embodiments were described with respect to a data stream of bit values compressed using an ABIC algorithm. However, those skilled in the art will recognize that the preferred embodiment technique for generating and using reentry data sets may be used with compression scheme that uses history data to decode/encode data to allow random access into the data stream at a particular point. For instance, the preferred embodiment encoding scheme may be used with entropy coding schemes, e.g., ABIC, Huffman coding, G4-MMR, JBIG-1, sequential JBIG-2, etc.

Preferred embodiments described information used by the decoder in the reentry data sets to decode from the location addressed by the pointer as N plus two previous bits, probability estimates and register values. However, the decoding information included with the reentry data sets may comprise any information the decoder needs in order to begin decoding from the point in the compressed data stream addressed by the pointer.

In preferred embodiments, the nearest neighbor bit values were used to decode the compressed data. In such embodiments, any number of neighbor bit values may be used to decode the data depending on the needs of the compression algorithm. In alternative compression algorithms, previous bit values other than the nearest neighbor bit values may be used to decode the data.

In preferred embodiments, the image data was expressed as individual values for each bit in a bit plane. In alternative embodiments, the bit values in each plane may be expressed as transition points, such that each plane stores the points at which the bit values transition from 0 to 1 or 1 to 0. In such embodiments, the decoder would decode the transition points in a manner known in the art, and then generate lines of bit values for the decompressed transition points. Alternately, if the decoder is just going to reencode or rotate the transition points, it only needs to partially decode to get these transition points.

Preferred embodiments were described with respect to decompressing still image data comprised of bits. In alternative embodiments, the data stream subject to the decoding/decompression techniques of the preferred embodiments may comprise other types of two dimensional data encoded on raster lines, such as scientific data, video data, masks, or any other data being compressed. It may also consist of non-two-dimensional data whose decoding depends upon previously decoded information.

In the described implementation, the lines of the image section had the same start and end locations in the data image. In alternative implementations, the start and end locations of the image section on different lines may vary.

Additionally, multiple groups of reentry data sets may be provided to allow multiple image sections to be independently decoded from a compressed data stream, where each group of reentry data sets would decode a different portion of the compressed data stream to produce different image sections. Moreover, data decoding from different locations can be interleaved, where a portion of different sections are sequentially decoded to decode from different locations in the image. After decoding sections from each of the multiple locations, the decoding would then return to sequentially decode the next section from each of the multiple locations in the interleaved fashion.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for decompressing a compressed data stream whose decoded output comprises lines of two-dimensional data, comprising:
   receiving a compressed data stream;
   receiving at least one pointer to a location in the compressed data stream, wherein the whose decoded output of the compressed data stream comprises a location on a line of data;
   receiving decoding information for each received pointer that enables decoding from a point within the compressed data stream addressed by the pointer, wherein the decoding information includes data from at least one line of the two dimensional data preceding the location on the line of data addressed by the pointer;
   for each received pointer, performing:
      (i) accessing the location in the compressed data stream addressed by the received pointer; and
      (ii) using the received decoding information including the data from the at least one line of the two dimensional data to decode compressed data from the accessed location.

2. The method of claim 1, wherein the decoded output comprises image data.

3. The method of claim 1, further comprising:
   buffering the decoded data; and
   outputting the buffered decoded data.

4. The method of claim 3, wherein the buffered decoded data generated comprises a data section having a line width that is less than a line width of the decoded input compressed data stream.

5. The method of claim 1, wherein the received pointer and decoding information are included in a reentry data set.

6. The method of claim 5, further comprising:
   generating the reentry data sets when decoding an input compressed data stream; and
   outputting an output compressed data stream that comprises the compressed data decoded using the reentry data sets.

7. The method of claim 6, wherein the input and output compressed data streams are identical.

8. The method of claim 6, wherein the input compressed data stream includes more data than the output compressed data stream.

9. The method of claim 6, wherein the reentry data sets are generated by a reentry decoder that decodes the input compressed data stream and passes each reentry data set and the output compressed data stream to a decoder to decode the output compressed data stream using the reentry data sets.

10. The method of claim 1, wherein the reentry data sets are generated by an encoder when encoding the compressed data stream.

11. The method of claim 1, further comprising using previously decoded data to decode the compressed data stream.

12. The method of claim 11, wherein the previously decoded data used to decode the compressed data stream is included in the reentry data sets.

13. The method of claim 11, wherein the previously decoded data is generated when decoding the compressed data stream using the reentry data sets.

14. The method of claim 13, wherein additional previously decoded data in the reentry data set is also used to decode the compressed data stream.

15. The method of claim 11, wherein the decoding information includes probability estimates used to decode the compressed data stream at the location addressed by the pointer.

16. The method of claim 15, wherein the data is decoded using an Adaptive Bi-Level Image Compression (ABIC) algorithm.

17. The method of claim 11, wherein decoding begins from the location in the compressed data stream addressed by the pointer in a first reentry data set, wherein the first reentry data set further includes all the previously decoded data needed to decode from the pointer in the first reentry data set to generate as output a first line of data.

18. The method of claim 17, wherein for each reentry data set following the first reentry data set, further comprising using previously decoded data generated using another reentry data set.

19. The method of claim 18, wherein each reentry data set following the first reentry data set further includes previously decoded data to use when decoding from the location in the compressed data stream addressed by the pointer in the reentry data set.

20. The method of claim 11, wherein the previously decoded data used to decode the compressed data stream comprises a set of nearest neighbor bit values to the bit value generated by decoding the location in the compressed data stream addressed by the pointer.

21. The method of claim 1, further comprising:
   receiving multiple pointers to different sections of the compressed data stream and receiving decoding information for each received pointer; and
   sequentially decoding a portion of each section of the compressed data stream beginning at the location in the compressed data stream addressed by one of the pointers using the decoding information for the pointer.

22. A system for decompressing a compressed data stream whose decoded output comprises lines of two-dimensional data, comprising:
  a computer readable medium including:
    (i) a compressed data stream;
    (ii) at least one pointer to a location in the compressed data stream, wherein the decoded output of the compressed data stream comprises a location on a line of data;
    (iii) decoding information for each received pointer that enables decoding from a point within the compressed data stream addressed by the pointer, wherein the decoding information includes data from at least one line of the two dimensional data preceding the location on the line of data addressed by the pointer;
  means for accessing the location in the compressed data stream in the computer readable medium addressed by the received pointer; and
  means for using the decoding information including the data from the at least one line of the two dimensional data in the computer readable medium to decode compressed data from the accessed location.

23. The system of claim 22, wherein the decoded output comprises image data.

24. The system of claim 22, further comprising:
  means for buffering the decoded data; and
  means for outputting the buffered decoded data.

25. The system of claim 24, wherein the buffered decoded data generated comprises a data section having a line width that is less than a line width of the decoded input compressed data stream.

26. The system of claim 22, wherein the computer readable medium further includes reentry data sets, wherein each reentry data set includes one pointer and the decoding information for the pointer.

27. The system of claim 26, further comprising:
  means for generating the reentry data sets when decoding an input compressed data stream; and
  means for outputting an output compressed data stream that comprises the compressed data decoded using the reentry data sets.

28. The system of claim 27, wherein the input and output compressed data streams are identical.

29. The system of claim 27, wherein the input compressed data stream includes more data than the output compressed data stream.

30. The system of claim 27, further comprising:
  a reentry decoder for generating the reentry data sets by decoding the input compressed data stream and transmitting each reentry data set and the output compressed data;
  a decoder for receiving the transmitted reentry data set and decoding the output compressed data stream using the reentry data sets.

31. The system of claim 22, further comprising:
  an encoder for generating the reentry data sets when encoding the compressed data stream.

32. The system of claim 22, further comprising means for using previously decoded data to decode the compressed data stream.

33. The system of claim 32, wherein the previously decoded data used to decode the compressed data stream is included in the reentry data sets.

34. The system of claim 32, wherein the previously decoded data is generated when decoding the compressed data stream using the reentry data sets.

35. The system of claim 34, wherein additional previously decoded data in the reentry data set is also used to decode the compressed data stream.

36. The system of claim 32, wherein the decoding information includes probability estimates used to decode the compressed data stream at the location addressed by the pointer.

37. The system of claim 32, wherein decoding begins from the location in the compressed data stream addressed by the pointer in a first reentry data set, wherein the first reentry data set further includes all the previously decoded data needed to decode from the pointer in the first reentry data set to generate as output a first line of data.

38. The system of claim 37, further comprising means for using previously decoded data generated using another reentry data set for each reentry data set following the first reentry data set.

39. The system of claim 38, wherein each reentry data set following the first reentry data set further includes previously decoded data to use when decoding from the location in the compressed data stream addressed by the pointer in the reentry data set.

40. The system of claim 32, wherein the previously decoded data used to decode the compressed data stream comprises a set of nearest neighbor bit values to the bit value generated by decoding the location in the compressed data stream addressed by the pointer.

41. The system of claim 22, wherein the computer readable medium further concludes multiple pointers to different sections of the compressed data stream and decoding information for each pointer; and
  means for sequentially decoding a portion of each section of the compressed data stream beginning at the location in the compressed data stream addressed by one of the pointers using the decoding information for the pointer.

42. An article of manufacture for decompressing a compressed data stream whose decoded output comprises lines of two-dimensional data, wherein the article of manufacture includes program logic performing:
  receiving a compressed data stream;
  receiving at least one pointer to a location in the compressed data stream, wherein the decoded output of the compressed data stream comprises a location on a line of data;
  receiving decoding information for each received pointer that enables decoding from a point within the compressed data stream addressed by the pointer, wherein the decoding information includes data from at least one line of the two dimensional data preceding the location on the line of data addressed by the pointer;
  for each received pointer, performing:
    (i) accessing the location in the compressed data stream addressed by the received pointer; and
    (ii) using the received decoding information including the data from the at least one line of the two dimensional data to decode compressed data from the accessed location.

43. The article of manufacture of claim 42, wherein the decoded output comprises image data.

44. The article of manufacture of claim 42, wherein the program logic further performs:
  buffering the decoded data; and
  outputting the buffered decoded data.

45. The article of manufacture of claim 44, wherein the buffered decoded data generated comprises a data section having a line width that is less than a line width of the decoded input compressed data stream.

46. The article of manufacture of claim 42, wherein the received pointer and decoding information are included in a reentry data set.

47. The article of manufacture of claim 46, wherein the program logic further performs:

generating the reentry data sets when decoding an input compressed data stream; and outputting an output compressed data stream that comprises the compressed data decoded using the reentry data sets.

48. The article of manufacture of claim 47, wherein the input and output compressed data streams are identical.

49. The article of manufacture of claim 47, wherein the input compressed data stream includes more data than the output compressed data stream.

50. The article of manufacture of claim 47, wherein the reentry data sets are generated by a reentry decoder that decodes the input compressed data stream and passes each reentry data set and the output compressed data stream to a decoder to decode the output compressed data stream using the reentry data sets.

51. The article of manufacture of claim 42, wherein the reentry data sets are generated by an encoder when encoding the compressed data stream.

52. The article of manufacture of claim 42, wherein the program logic further performs using previously decoded data to decode the compressed data stream.

53. The article of manufacture of claim 52, wherein the previously decoded data used to decode the compressed data stream is included in the reentry data sets.

54. The article of manufacture of claim 52, wherein the previously decoded data is generated when decoding the compressed data stream using the reentry data sets.

55. The article of manufacture of claim 54, wherein additional previously decoded data in the reentry data set is also used to decode the compressed data stream.

56. The article of manufacture of claim 52, wherein the decoding information includes probability estimates used to decode the compressed data stream at the location addressed by the pointer.

57. The article of manufacture of claim 56, wherein the data is decoded using an Adaptive Bi-Level Image Compression (ABIC) algorithm.

58. The article of manufacture of claim 52, wherein decoding begins from the location in the compressed data stream addressed by the pointer in a first reentry data set, wherein the first reentry data set further includes all the previously decoded data needed to decode from the pointer in the first reentry data set to generate as output a first line of data.

59. The article of manufacture of claim 58, wherein for each reentry data set following the first reentry data set, further comprising using previously decoded data generated using another reentry data set.

60. The article of manufacture of claim 59, wherein each reentry data set following the first reentry data set further includes previously decoded data to use when decoding from the location in the compressed data stream addressed by the pointer in the reentry data set.

61. The article of manufacture of claim 52, wherein the previously decoded data used to decode the compressed data stream comprises a set of nearest neighbor bit values to the bit value generated by decoding the location in the compressed data stream addressed by the pointer.

62. The article of manufacture of claim 42, wherein the program logic further performs:

receiving multiple pointers to different sections of the compressed data stream and receiving decoding information for each received pointer; and sequentially decoding a portion of each section of the compressed data stream beginning at the location in the compressed data stream addressed by one of the pointers using the decoding information for the pointer.

* * * * *